United States Patent [19]

Laciak et al.

[11] Patent Number: 4,758,250
[45] Date of Patent: Jul. 19, 1988

[54] AMMONIA SEPARATION USING ION EXCHANGE POLYMERIC MEMBRANES AND SORBENTS

[75] Inventors: Daniel V. Laciak, Fogelsville; Guido P. Pez, Allentown, both of Pa.

[73] Assignee: Air Products and Chemicals, Inc., Allentown, Pa.

[21] Appl. No.: 57,135

[22] Filed: Jun. 1, 1987

[51] Int. Cl.$^4$ .................... B01D 53/22; B01D 53/04
[52] U.S. Cl. ............................. 55/16; 55/70; 55/74
[58] Field of Search ............... 55/16, 70, 74, 158, 55/387; 210/638, 640, 660, 681; 423/237; 521/25

[56] References Cited

U.S. PATENT DOCUMENTS

| | | | |
|---|---|---|---|
| 2,681,319 | 6/1954 | Bodamer | 210/638 X |
| 3,475,330 | 10/1969 | Gilles | 210/681 X |
| 3,545,931 | 12/1970 | McKinley, Jr. | 55/158 X |
| 3,554,905 | 1/1971 | Place et al. | 210/638 |
| 3,723,306 | 3/1973 | Bridgeford | 210/638 |
| 3,948,769 | 4/1976 | Dobbs | 210/681 X |
| 4,125,462 | 11/1978 | Latty | 210/638 |
| 4,156,597 | 5/1979 | Browall | 55/70 X |
| 4,180,553 | 12/1979 | Null et al. | 55/16 X |
| 4,262,041 | 4/1981 | Eguchi et al. | 210/500.42 X |
| 4,439,351 | 3/1984 | Sinha | 423/237 X |
| 4,537,760 | 8/1985 | Lavie | 423/359 |
| 4,547,293 | 10/1985 | King et al. | 210/638 |
| 4,608,060 | 8/1986 | Kulprathipanja et al. | 55/16 |
| 4,661,257 | 4/1987 | Kreevoy et al. | 210/638 |

FOREIGN PATENT DOCUMENTS

| | | |
|---|---|---|
| 86102208.5 | 2/1986 | European Pat. Off. . |
| 790510 | 2/1958 | United Kingdom ............... 423/237 |
| 866723 | 4/1961 | United Kingdom ............... 210/638 |
| 2145702A | 4/1985 | United Kingdom . |
| 1063774A | 12/1983 | U.S.S.R. . |

OTHER PUBLICATIONS

R. D. Rice and J. V. Busa, CEP, Oct. 1984, p. 61, "Treating Acid & Sour Gas: Recovering NH$_3$ by the PHOSAM-W Process".

Z. Prokop and K. Setinek, J. Polymer Science, Polymer Chem. Ed., vol. 12, 2535–2543, (1974) "Sorption of Gaseous Ammonia on Sulfonated Macroreticular Ion Exchangers".

C. Lochmuller et al, Analytical Letters, 18(A4), 423–428 (1985), "Chemically–Modified Ion–Exchange Membranes as Sampling Devices for Gas-Phase Ammonia".

Foote and Hunter, J. Am. Chem. Soc., 42, 19 (1920), p. 69, "Equilibrium in the System Ammonia–Ammonium Thiocyanate".

Brubaker and Kammermeyer, Ind. Eng. Chem., 46, p. 733 (1954), "Separation of Gases by Plastic Membranes".

Kostrov et al, Plast. Massy., vol. 5, pp. 18–19 (1981) (trans.), "Effect of Ammonia on the Properties of Fluorine–Containing Polymers".

R. M. Barrer et al, J. Chem. Soc., Faraday Trans., 1, 69, 2166 (1973), "Transport of Single Gases and of Binary Gas Mixtures in a Microporous Carbon Membrane".

S. Kamata and M. Toshiro, J. Chem. Soc. Jpn., Ind. Chem. Soc., 73, 1083 (1970).

M. Stainer et al, J. Electrochem. Soc., vol. 131, 789 (1984), "Stoichiometry of Formation and Conductivity Response of Amorphous and Crystalline Complexes Formed between Poly(ethylene oxide) and Ammonium Salts: PEO$_x$.NH$_4$SCN and PEO$_x$.NH$_4$SO$_3$CF$_3$".

Primary Examiner—Robert Spitzer
Attorney, Agent, or Firm—Mark L. Rodgers; William F. Marsh; James C. Simmons

[57] ABSTRACT

The present invention is a process for separating ammonia from mixtures of other gases or from aqueous streams. The ammonia containing mixture is contacted with an anion exchange polymer cast into membrane form, which selectively permeates NH$_3$ thereby providing a separation from the other components in the mixture. Alternatively, ammonia recovery may be achieved by employing the said anion exchange polymer as a selective, reversible NH$_3$ sorbent.

19 Claims, 2 Drawing Sheets

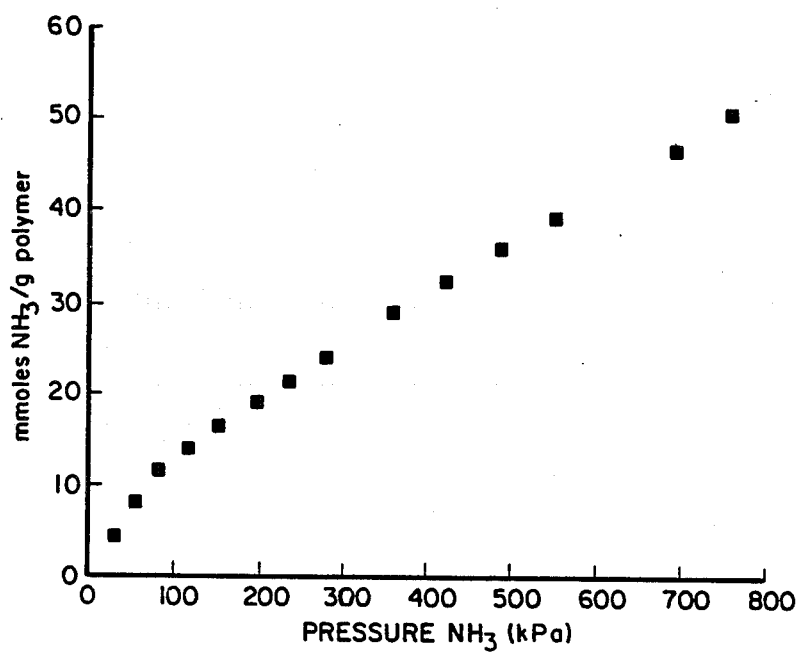

AMMONIA SEPARATION USING ION EXCHANGE POLYMERIC MEMBRANES AND SORBENTS

TECHNICAL FIELD

The present invention relates to the separation of ammonia from mixtures of other gases, or from aqueous streams. More particularly, it relates to processes which use novel semipermeable membranes that are effective for the selective permeation of ammonia from mixtures of ammonia and other components such as nitrogen and hydrogen. The active materials in the semipermeable membranes may also be employed as selective $NH_3$ sorbents for the recovery of ammonia from such mixtures.

BACKGROUND OF THE INVENTION

There are a number of industrial processes in which it is necessary to separate $NH_3$ from mixtures of other gases, or from aqueous streams. Perhaps the largest scale separation is the removal of $NH_3$ from the gas mixture that is present in the recycle loop of an ammonia synthesis plant. Currently, this separation is accomplished by refrigeration, with ammonia being removed in a liquid state. In other operations, such as in petroleum refineries and other related industries, ammonia is removed by steam stripping. Various attempts have been made to develop an efficient and practical sorption system for the selective removal and recovery of $NH_3$ from various gaseous and aqueous streams.

Alumina silicate zeolites and high surface area carbons, have been widely used as ammonia sorbents. U.S. Pat. No. 4,537,760 and U.K. patent application 2145702-A both disclose processes which utilize such sorbents for the separation of $NH_3$ from the mixture of gases present in the recycle loop of an ammonia plant. Additionally, R. D. Rice and J. V. Busa in *Chemical Engineering Processing*, October 1984, page 61 disclosed the use of solutions of ammonium diacid phosphate as selective, reversible sorbents for ammonia.

A number of organic polymer systems have been shown to sorb ammonia from gaseous mixtures. S. Kamata and M. Tashiro, *J. Chem. Soc. Jpn., Ind. Chem. Soc.*, 73 1083 (1970) disclose the use of cation exchange resins in the proton and metal ion forms to take up ammonia with varying degrees of reversibility. It was shown that the $H^+$, $Ni^{II}$, $Cu^{II}$, $Co^{II}$ and $Zn^{II}$ forms of Amberlyst 15 cation exchange resins have an appreciable capacity for $NH_3$. Similarly, Z. Prokop and K. Setinek, *J. Polym. Science, Polym. Chem. Ed.* 12, (11), 2535-43 (1974) disclose the use of cation exchange resins in the ammonium ($NH_4^+$) form for absorption of ammonia. Other known materials which can be used for ammonia absorption include cellulose acetate, ethyl cellulose, cellulose acetabutyrate and hydroxycelluloses. Recently, C. H. Lochmuller, et al. *Analytical Letters* 18(A)(4) 423 (1985) have reported the use of $Co^{2+}$ ion exchanged Nafion (available in the $Na^+$ form from E. I. DuPont & Company) as a reversible sorbent for $NH_3$.

It was disclosed by H. W. Foote and M. A. Hunter, *J. Am. Chem. Soc.*, 42, 19 (1920) that ammonia can be sorbed by ammonium thiocyanate. It has been known for many years that ammonium nitrate and ammonium thiocyanate deliquesce in the presence of ammonia vapor, yielding very concentrated solutions of these salts in liquid ammonia. Recent studies, using Raman spectroscopy, have shown that there is a strong interaction between $NH_3$ and the sulfur end of the $SCN^-$ ion, although the mechanism of this interaction is not fully understood. Foote and Hunter disclosed the possibility of using ammonium thiocyanate as an absorbent to effect the removal of $NH_3$ from the recycle loop of an $NH_3$ plant, but implementation was not accomplished presumably because of the highly corrosive nature of the ammonia/$NH_4SCN$ solutions towards most metals.

Several membrane-based gas separation technologies for the separation of ammonia from other gases have received limited disclosure in the literature. Most of the polymeric materials discussed in the prior art which are used for membrane separations, exhibit poor selectivity for ammonia passage and hence are not well suited for ammonia separation processes. Other difficulties with such polymeric membranes are related to the low absolute permeability of $NH_3$ and the stability of the polymers to $NH_3$ at higher than ambient temperatures.

D. W. Brubaker and K. Kammermeyer, *Ind. Eng. Chem.*, 46,733 (1954) disclosed the use of a polyethylene film membrane for the separation of $NH_3$ from $N_2$ and $H_2$ in an ammonia synthesis plant. Because of difficulties associated with the low absolute permeability of the film for $NH_3$, and the poor separation factor for $NH_3$ versus $H_2$ and $N_2$, it was felt that the system would not be competitive with the conventional refrigeration methods.

U.S. Pat. No. 3,545,931 discloses the use of a polytetrafluoroethylene membrane for $NH_3$ separation in conjunction with a system which detects and quantifies the concentration of $NH_3$ in aqueous streams. Although actual separation data is not given in the patent, the permeability of the polytetrafluoroethylene membrane towards $NH_3$ is very low as it is for other gases.

Kostrov, et al., *Plast. Massy, Vol.* 5, pp. 18-19, (1981) found that a vinylidene fluoride-tetrafluoroethylene copolymer membrane exhibited surprisingly high $NH_3$ selectivity/permeability properties, especially in relation to the parent homopolymers. The high permeability of ammonia is ascribed to an unspecified reaction between ammonia and the copolymer, which is rendered yellow upon exposure to $NH_3$ gas. It is known that polyvinylidene fluoride is degraded on prolonged contact with aniline, which is a much weaker base than ammonia, at 23° C. and by aqueous NaOH at 120° C. It is, therefore, believed that the above copolymer and its $NH_3$ reaction product would ultimately degrade with usage and, therefore, would not be a viable material for permeating ammonia.

Russian Pat. No. SU 1063774-A references unpublished Russian data on a hydrated cellulose membrane for the separation of $NH_3$ from $H_2$, and claims improved membranes based on aromatic polysulfonamide polymers. Hydrated cellulose has a moderate $NH_3$ permeability and selectivity performance in separating $NH_3$ from $H_2$, but it has a narrow range of usefulness with respect to temperature and pressure of ammonia. Degradation of the membrane is observed at higher temperatures and over extended use. R. M. Barrer, et al., *J. Chem. Soc. Faraday Trans.* 1,69, 2166 (1973) describe the operation of a very selective carbon plug membrane for the separation of $NH_3$ from $N_2$ and $H_2$. The membrane, which relies on the condensation and "surface flow" of $NH_3$ in the microporous carbon, has been shown to operate effectively with an $NH_3/H_2$ selectivity of about 250 at conditions that are near the point of liquefaction of ammonia. Otherwise, however, the $NH_3/H_2$ selectivity decreases rapidly at other conditions. Accordingly, it is unlikely that this carbon membrane would be useful for the separation of $NH_3$ from other gases in the ammonia synthesis loop at the conditions of interest.

Recently S. Kulprathipanja and S. S. Kulkarni have disclosed in U.S. Pat. No. 4,608,060 the preparation of a multicomponent membrane comprising silicone rubber and polyethylene glycol which can separate ammonia from $N_2$ and $H_2$. The membrane shows a very high ammonia permeance of $\approx 30 \times 10^{-5}$ $cm^3(STP)/cm^2.sec.cmHg$, but the $NH_3/H_2$ separation factor is relatively low ($\approx 80$).

G. P. Pez and R. T. Carlin have described in European Patent Application No. 86102208.5, the achievement of an effective separation of $NH_3$ from $N_2$ and $H_2$ at high temperatures (250°-350° C.), using a membrane consisting of a reversibly ammonia reactive molten salt (e.g., $ZnCl_2$) immobilized in a porous metallic or ceramic support.

BRIEF DESCRIPTION OF THE DRAWINGS

FIG. 2 is a graph of the sorption capacity of polyvinylammonium thiocyanate ($PVNH_3^+SCN^-$) vs. $NH_3$ pressure at 24.6° C.

BRIEF SUMMARY OF THE INVENTION

Figure 1:
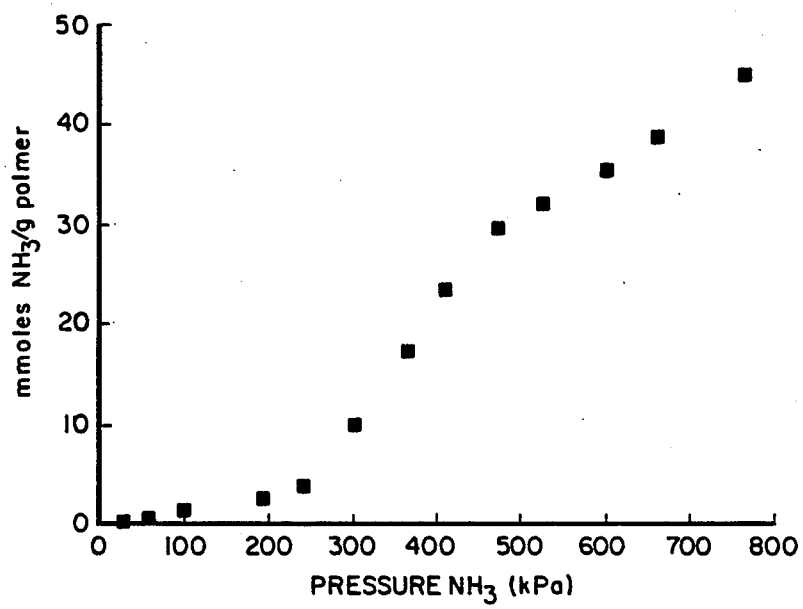
FIG. 1 is a graph of the sorption capacity of polyvinylammonium chloride ($PVNH_3^+Cl^-$) vs. $NH_3$ pressure at 26° C.

The present invention is a process for separating ammonia from a mixture of gases or liquids containing ammonia and at least one other component by contacting the ammonia-containing mixture with an anion-exchange polymer. The anion-exchange polymer has a general structural formula:

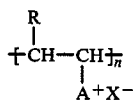

where "R" is methyl, phenyl or hydrogen, "A+" is any bound cationic species, "X−" is any anion and "n" is between 2 and $10^7$.

In an additional embodiment, the anion-exchange polymer has the general structural formula:

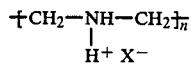

wherein "X−" is any anion and "n" is between 2 and $10^7$.

For the separation of ammonia, the anion-exchange polymers described above may be used either as absorbents or employed in the form of thin films as semipermeable membranes. In the first embodiment granules or pellets containing the polymers are contacted with the ammonia containing mixture wherein the $NH_3$ is selectively absorbed. The ammonia may subsequently be recovered by heating the resulting ammonia-polymer adduct, reducing the $NH_3$ pressure, or a combination of both. Alternatively, in another embodiment of the invention the anion-exchange polymers may be cast into thin films which can be supported on, or encapsulated within, a gas permeable polymer. The supported films function as very effective membranes for the separation of ammonia from other gases, particularly mixtures of ammonia, nitrogen and hydrogen. This embodiment also provides membranes which have a very high mechanical strength and have been shown to withstand pressure differentials of up to at least 1000 psi. In addition, this form also provides resistance to water.

DETAILED DESCRIPTION OF THE INVENTION

The separation of a component from a mixture of gases, liquids, or vapors can be effected by methods which rely on the selective sorption of the particular component, or, alternatively, by the utilization of semipermeable membranes which are selective to the passage of the selected component. The present invention is a process for separating ammonia from a mixture of gases or liquids containing ammonia and at least one other component, employing novel polymer compositions which function, in the appropriate configuration, either as selective ammonia-sorbents or selectively ammonia permeable membranes.

In its broadest sense, the present invention relates to the preparation and use of anion exchange polymeric materials that are high capacity, reversible sorbents for ammonia. The sorbents, in the form of granules or films can be used as $NH_3$ sorbents in pressure-swing, vacuum-swing or temperature-swing types of separation processes. Alternatively, the sorbents when cast into the form of thin films and suitably supported, can function as semipermeable membranes which are surprisingly effective for the selective permeation of ammonia from mixtures containing this gas.

The anion-exchange polymer of the present invention has the general structural formula:

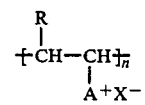

where "R" is methyl, phenyl or hydrogen, "A+" is any bound cationic species, "X−" is any anion and "n" is between 2 and $10^7$. The groups A+, X− should not react adversely with the polymer or ammonia. In a preferred embodiment the bound group A+ will be an ammonium cation, $NR_3^+$ where R may be alkyl or H. In the most preferred embodiment the bound group A+ will be $NH_3^+$.

In an additional embodiment, the anion-exchange polymer has the general structural formula:

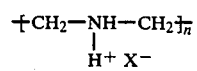

wherein "X−" is any anion and "n" is between 2 and $10^7$.

It should be understood that the term "polymer" as used herein is also meant to include oligomers having the above structural formulas wherein "n" is between 2 and several hundred.

In both of the above embodiments, the group X may be any organic or inorganic anion, such as a nitrate, acetate, halide, $TeCN^-$, $SeCN^-$, or $SCN^-$, or a complex anion such as $CuCl_3^-$. The expected order of effectiveness with respect to reversible $NH_3$ sorption capacity of these ionic polymers for various, inorganic anions is:

$$TeCN^- \sim SeCN^- \gtrsim SCN^- > I^- \\ > NO_3^- > Br^- > Cl^-.$$

The group $X^-$ may also be an organic anion such as a carboxylate, $R'COO^-$, when $R'$ is H or a hydrocarbon group.

The ionic polymeric salts (ionomers) visibly swell upon exposure to ammonia at various pressures in the range of 100–500 kPa $NH_3$. The sorption isotherms which give the amount of $NH_3$ sorbed versus ammonia pressure were measured for the polymeric salts polyvinylammonium chloride and polyvinylammonium thiocyanate: results are shown in FIGS. 1 and 2 respectively.

From the data given in FIG. 1, it is evident that polyvinylammonium chloride, $PVNH_3^+Cl^-$ sorbs small amounts of ammonia until a threshhold pressure of about 250 kpa ($\approx 2.5$ atm) is is attained, at which point there is a marked increase in $NH_3$ sorption, accompanied by a visible swelling of the polymer. The resulting clear material, at approximately 350 kpa $NH_3$ pressure, is (at room temperature) a polymer gel wherein the liquid swelling medium (penetrant) is liquid ammonia. X-ray diffraction studies indicate that surprisingly, at least some $NH_4Cl$ is formed by reaction of $PVNH_3^+Cl^-$ with $NH_3(g)$:

$$PVNH_3^+Cl^- + NH_3(g) \rightarrow PVNH_2 + NH_4^+Cl^-.$$

The results reported in FIG. 2 show that at room temperature polyvinylammonium thiocyanate has an even higher affinity and capacity for $NH_3$, than the $PVNH_3^+Cl^-$ salt. This higher capacity is expected in view of the sorption capacity series set out above. $PVNH_3^+SCN^-$ showed a continuous sorption of $NH_3$, however the salt showed no evidence of the formation of crystalline $NH_4SCN$ on treatment of the polymer with ammonia. It was found that a polymer gel with liquid $NH_3$ as the penetrant could be prepared even under 1 atm of $NH_3(g)$.

The results shown in FIGS. 1 and 2 clearly indicate that the anion exchange polymers of the present invention are well suited as selective, reversible sorbents of ammonia. A gaseous or liquid stream containing ammonia and at least one other component is contacted with the polymer which may be either in the form of granules, pellets or contained in an inert porous support. The polymers of the present invention are soluble in water. Hence, when separating ammonia from aqueous mixtures it will be necessary to coat or encapsulate particles of the absorbent with a gas-permeable but non-water soluble polymer such as silicone rubber, poly(trimethylsilylpropyne) or poly(4-methyl-1-pentene). The granular, supported and/or encapsulated anion exchange polymer absorbent may be conveniently contained in a column or packed bed.

Following the ammonia absorption step, the absorbent $NH_3$ adduct may be isolated from the process stream and the ammonia recovered by heating and/or depressurization. In this manner a very effective recovery of ammonia from mixtures with other components can be realized.

We have found surprisingly, that the said anion exchange polymer salts when cast in a suitably supported thin film form, can function as remarkably effective ammonia permselective membranes. In a process for separating ammonia from a mixture of gases or liquids containing ammonia and at least one other component the mixture is passed over one side of a membrane; i.e., the feed or upstream side which contains as the active component a film or element of the anion exchange polymer. Ammonia selectively permeates through the membrane and may be recovered at the permeate or downstream side. For permeation to occur it is necessary to maintain a higher partial pressure (strictly, fugacity) of $NH_3$ at the feed side of the membrane. The required correspondingly lower partial pressure of ammonia at the permeate interface may be realized using a vacuum pump, compressor, inert gas sweep, or other suitable means.

The membrane, when used for instance in the separation of ammonia from nitrogen and hydrogen, is believed to function by the following mechanism. At the feed side ammonia dissolves in the anion exchange polymer, which has, as shown in FIG. 2 for the example of poly(vinylammonium thiocyanate), a very high capacity for the gas. The dissolved ammonia diffuses in a concentration gradient, towards the permeate interface where it is desorbed into the gas phase and recovered. It is also believed that the exceptional ammonia permeance observed arises from a combination of the high solubility and a surprisingly favorable diffusivity of ammonia in the membrane material. On the other hand, gases such as $H_2$, $N_2$, etc. may be expected to have somewhat greater diffusivities, but their solubility in the membrane is far less than that of $NH_3$, (by several orders of magnitude) so that their permeation rates; i.e., permeances, through the membrane will be relatively low. These considerations serve to explain the high permeances observed for ammonia and the very favorable permselective properties of the membrane for the recovery of ammonia from mixtures of ammonia, nitrogen and hydrogen.

The membrane consists of a suitably supported film or element of the anion exchanged polymers. Typically a thin film, of the order of 1 to 200 microns, is prepared by casting an aqueous solution of the polymer in water onto a flat surface followed by slow drying. The film may be supported on a porous polymer; i.e., Goretex ®, porous Teflon ®, or a highly gas-permeable polymer such as silicone rubber, poly(trimethylsilylpropyne) or poly(4 methyl 1-pentene). This assembly may be placed on a porous steel, ceramic or other substrate in order to provide the required mechanical support. Alternatively, the anion exchange polymer film may be encapsulated within a highly gas-permeable polymer. The above describes the fabrication of essentially a flat-sheet membrane, which could be employed as a flat plate, a series of discs or in a spiral wound sheet form.

In another embodiment of the invention the active anionic polymer could be incorporated within the wall of a hollow fiber such that there is an effective "conduction path" through this active polymer between the outer and inner regions of the hollow fiber. In addition, the inner and/or outer walls of this hollow fiber containing the active polymer could be coated with a thin film of a highly gas-permeable polymer; i.e., poly(trimethylsilylpropyne), such that the active polymer "element" is essentially encapsulated within the wall of the hollow fiber. In this method of fabrication it would clearly be desirable for the hollow fiber to be made of a material which itself has a very low permeability for all gases, especially hydrogen.

The present invention is suitable for a wide range of applications, such as for the separation of $NH_3$ from gas streams in the manufacture of acrylonitrile, from $CH_4$, CO, air and HCN in the Andrusow process for the manufacture of HCN and especially from the $NH_3$, $N_2$, $H_2$, $CH_4$, Ar mixture that is present in the recycle loop of an ammonia synthesis plant.

In a typical ammonia plant an approximately 3:1 mixture of hydrogen and nitrogen (with some Ar and $CH_4$) is compressed to about 3000 psi and passed through a catalytic converter resulting in about a 13% conversion to ammonia. The product stream is subsequently cooled, eventually by refrigeration, to condense most of the $NH_3$ and the remaining $NH_3$, $N_2$, $H_2$, Ar and $CH_4$ mixture is reheated and recycled through the reactor.

In an alternative process the ammonia could be recovered by inserting into the recycle loop, a permselective membrane that effectively permeates ammonia while retaining the $H_2$, $N_2$ and Ar in the recycle loop largely at system pressure. By avoiding or reducing the refrigeration step, significant savings in power and capital may be achieved. It is desirable that the membrane have both a high permeance for $NH_3$ and very large separation ($\alpha$) factors: $\alpha(NH_3/H_2)$, and $\alpha(NH_3/N_2)$. It is especially desirable that the $\alpha(NH_3/H_2)$ selectivity be very large so that $H_2$, which is the most abundant and costly component in the recycle loop, may be largely retained for recycling to the reactor. These requirements are met by the ammonia permselective membranes of the present invention.

EXPERIMENTAL

A. Membrane Performance Measurements

The various supported thin composite film and liquid membranes of the present invention were loaded into an appropriate test cell and evaluated for their permeation properties for ammonia, nitrogen and in some instances hydrogen.

All membrane experiments were performed using a specially-constructed membrane test cell. The membrane, in the form of a thin film, was supported between two stainless steel discs. A honeycomb arrangement of ⅛ diameter holes provided feed and permeate gas streams with access to the membrane. The exposed or "active" membrane surface area was 1.3 cm$^2$. In some experiments a thin sheet of woven stainless steel mesh (Pall Corp., Cortland, N.Y.) was used for added mechanical support. The specific design and structure of the membrane test cell is not critical and any such cell can be employed which gives accurate permeation measurements.

The permeation properties of the membranes mounted in the test cells were evaluated using a standard $NH_3$ permeation apparatus. Electronic mass flow controllers were used to blend a feed gas mixture which was passed over one surface of the membrane. The concentrations of permeate gases in a helium stream, passing over the other side of the membrane, were measured with a gas chromatograph (GC). The GC was equipped with a computer-controlled sampling device and a data reduction system such that the entire analysis was automated. The concentration of ammonia in the permeate was determined using a Chromosorb 103 column operated isothermally at 60° C.; oxygen, nitrogen, and hydrogen were separated using a molecular sieve 5A column. A palladium hydrogen transfer tube was utilized to diffuse hydrogen into a nitrogen carrier gas stream; this was necessary to retain good sensitivity for the analysis of hydrogen. The system was designed to operate at pressures up to 1 MPa. with partial pressure of $NH_3$ of up to ca. 600 kPa. In several examples, the apparatus was designed to deliver $NH_3(g)$ at 0.3 to 1.4 MPa and 30°–80° C. As with the membrane test cell, the specific apparatus employed is not critical and any suitable system may be used.

B. Calculations and Data Presentation

The flux of a particular gas passing through the membrane is determined from its concentration in the controlled flow of helium which sweeps the permeate side of the membrane. Membrane performance is typically expressed in terms of the permeance ($\phi$) for each gas that passes through the membrane. This $\phi$ is defined as the experimental flux J, (cm$^3$ sec$^{-1}$), per unit area A (cm$^2$) of membrane surface and unit pressure differential $\Delta P$ (cmHg) of the particular gas between the two interfaces of the membrane: $\phi = J/A.\Delta P$ in units of cm$^3$(STP)/cm$^2$.sec.cmHg.

For conventional polymer membranes, where Fick's Law and Henry's Law apply, the permeance is the standard permeability, Po. of the material (expressed as cm$^3$.cm/cm$^2$.sec.cmHg) divided by the membrane thickness 1 (cm). In the following examples, results are expressed in terms of $\phi$ rather than Po, since the membrane thickness is often not known (at least with any reasonable degree of precision) and Henry's Law is not necessarily applicable.

In addition, permeance values are interpreted herein with the assumption that in our experimental system there is near-zero recovery of the permeating gas, i.e., the feed stream is not significantly depleted of $NH_3$ via permeation of the gas. With some of the very effective ammonia permeation membranes there are departures from this idealized condition and, when this occurs, it is specified in each particular example. In any event, gas flow data is given for each example so that recovery can be estimated if necessary.

The selectivity of the membrane, expressed as $\alpha(NH_3/H_2)$ and $\alpha(NH_3/N_2)$, is given by the ratio of the simultaneously measured permeance values of the two gases. Because of the considerable swelling of the material that takes place with ammonia, it would not be meaningful to express the selectivity by the ratio of the individually observed $\phi NH_3$, $\phi N_2$ and $\phi H_2$. In addition, since the mere presence of sorbed $NH_3$ changes the nature of the membrane considerably, permeance values measured independently, such as for $N_2$ and $H_2$ in the absence of $NH_3$, would be those of quite different materials. For these reasons, the gas transport properties of the membranes were always determined using the relevant gas mixtures.

EXAMPLE 1

Preparation and Ammonia Sorption Properties of Poly(vinylammonium chloride)

U.S. Pat. No. 4,018,826 teaches the synthesis of poly(vinylamine) and its mineral acid salts. Our materials were prepared using a modified version of this technology whereby an increase in the molecular weight of the polymer was realized. (The molecular weight of the polymer is not believed to be critical and a polymer of any Mn, Mw which allows casting of suitable films may be used.) Thus, poly(vinylammonium chloride) was prepared with molecular weights Mn, of 1,600,000–2,000,000 with Mn/Mw $\approx$2. This polymer analyzed as: 27.45% C, 7.93% H, 15.36% N, 36.25% Cl, 10.96% O, which corresponds to the molecular formula:

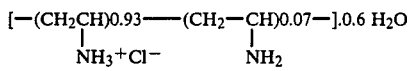

The $PVNH_3^+Cl^-$ was observed to swell, visibly, when placed under 350 kPa $NH_3(g)$ at room temperature; however, no swelling was observed below 300 kPa. An ammonia sorption isotherm for this material, expressed as mmoles $NH_3$ sorbed/gram of polymer versus pressure, was measured by standard volumetric sorption techniques and is shown in FIG. 1.

EXAMPLE 2

Preparation and Ammonia Sorption Properties of Poly(vinylammonium thiocyanate)

Poly(vinylammonium thiocyanate), $PVNH_3^+SCN^-$, was prepared by ion exchange of $PVNH_3^+Cl^-$ with ammonium thiocyanate. Films of $PVNH_3^+Cl^-$ were prepared as in Example 1. The exchange reaction was carried out in MPLC column of ca. 2" dia. (Kontes #K240800). During the exchange reaction, the $PVNH_3^+Cl^-$ films were separated by porous glass frits. Glass beads were used as added weight to minimize swelling of the membranes. A 500X excess of $NH_4SCN$ (saturated solution in methanol) was passed through the films over the course of 6 hours, and was followed by repeated washings with fresh MeOH. The concentration of $Cl^-$ and $SCN^-$ in the effluent was monitored with an $AgNO_3$ spot test. When no precipitate formed, an extra 500 cc MeOH was eluted through the column and the films were subsequently removed and dried under $N_2$. A typical elemental analysis of $PVNH_3^+SCN^-$ prepared by this method is: % C 34.49, % H 6.82, % N 24.99, % Cl 0.30, % S 24.51 which corresponds to an ionomer which is about 77% in the $SCN^-$ form (the remainder being presumably $Cl^-$ or free amine). Films thus prepared were found to be visibly swollen by $H_2O(l)$ and also by 200–300 kPa $NH_3(g)$ at room temperature. The ammonia sorption isotherm for this material was measured using standard volumetric methods and is shown in FIG. 2.

EXAMPLE 3

Fabrication and Performance of a Poly(vinylammonium Chloride) Membrane

An aqueous solution of polyvinylammonium chloride, $PVNH_3^{+Cl-}$, prepared as in Example 1, was evaporated to dryness under $N_2$ in a polycarbonate petri dish. The resulting films were usually 80–150 μm in thickness. A film was sealed in a membrane cell of area 1.3 cm². The composition of the feed gas was maintained at 3:1 $NH_3:N_2$. Total pressure of the feed stream was increased so as to produce the partial pressures of $NH_3$ given in Table I; the pressure in the sweep stream was raised concurrently so that the film experienced a minimal transmembrane pressure gradient. The results are shown in Table I below.

TABLE I

PERFORMANCE OF A $PVNH_3^+Cl^-$ MEMBRANE AT 17° C.

| FEED GAS FLOW: 20 SCCM | | PERMEATE GAS He FLOW: 20 SCCM | | PERMEANCE | SELECTIVITY |
|---|---|---|---|---|---|
| $P(NH_3)$ (kPa) | $P(N_2)$ (kPa) | $P$(TOTAL) (kPa) | VOL % $NH_3$ | $\phi(NH_3)$ (cm³/cm²·s·cmHg) | $\alpha (NH_3/N_2)$* |
| 74 | 25 | 100 | 0.06 | $2.9 \times 10^{-6}$ | >50 |
| 373 | 125 | 498 | 1.70 | $1.6 \times 10^{-5}$ | >800 |
| 449 | 149 | 598 | 6.03 | $5.0 \times 10^{-5}$ | >1000 |

*After correction for background air.

EXAMPLE 4

Fabrication and Performance of a $PVNH3^+Cl^-$ Ammonia Transport Membrane Operating Under a High Transmembrane Pressure Gradient.

A thin film of $PVNH_3^+Cl^-$ ($\approx$180 μm) was prepared as in Example 3. A modification of the standard test cell was used wherein a woven stainless steel mesh ~3-2 mm in thickness (Pall Corp., Cortland, N.Y.) was countersunk into the inner plates in order to provide mechanical support for the membrane.

The membrane, sealed in the cell, was attached to an apparatus capable of generating feed gas mixtures with high partial pressure of ammonia and tested for the separation of $NH_3$ from $NH_3/N_2$ mixtures at 25° C. The experiment was conducted over a seven-day period. Results are shown in Table II below.

To calculate the values of the ammonia permeance, $\phi NH_3$, an "open" cell area of 1.3 cm² was used. The extent to which the "active" area is decreased by the addition of the support, or the tortuosity is increased, is not known exactly; nor is the extent to which the membrane creeps into the mesh. Therefore, the permeance values shown in Table II do not include corrections for these effects.

It is evident that a good separation of ammonia has been achieved using this membrane. Furthermore, with adequate mechanical support, it was shown that the membrane could operate under high mechanical pressure gradients. It is significant that although 2.6 MPa was sufficient to deform the stainless steel mesh support, however, no deterioration of the membrane was observed under these conditions.

TABLE II

PERFORMANCE OF A PVNH$_3^+$Cl$^-$ MEMBRANE UNDER A HIGH TRANSMEMBRANE PRESSURE GRADIENT AT 25° C.

| FEED GAS FLOW: 60 SCCM | | PERMEATE GAS He FLOW: 20 SCCM | | PERMEANCE | SELECTIVITY |
|---|---|---|---|---|---|
| P(NH$_3$) (kPa) | P(N$_2$) (kPa) | P(TOTAL) (kPa) | VOL % NH$_3$ | $\phi$(NH$_3$) (cm$^3$/cm$^2 \cdot$ s $\cdot$ cmHg) | $\alpha$(NH$_3$/N$_2$) |
| 827 | 550 | 101 | 7.74 | 3.2 × 10$^{-5}$ | 2100 |
| 827 | 1239 | 101 | 6.53 | 2.7 × 10$^{-5}$ | 2500 |
| 827 | 1928 | 101 | 5.80 | 2.4 × 10$^{-5}$ | 2200 |

EXAMPLE 5

Fabrication and Performance of a Poly(vinylammonium Thiocyanate) Membrane

A SCN$^-$ exchanged film was prepared as in Example 2. To prevent the membrane from cracking as it was sealed in the cell, it was pre-conditioned (allowed to soften) under $\approx$1 atm NH$_3$(g) at room temperature for 1 hour prior to the membrane experiment.

For added mechanical support and ease of handling, the PVNH$_3$ +SCN$^-$ film was sandwiched between two pieces of $\approx$50 $\mu$m, thick porous Teflon ®. As discussed previously, the effect of the added support is not known precisely and so no corrections were made in the calculation of $\phi$NH$_3$.

The membrane was tested for NH$_3$ transport at several temperatures. The composition of the feed gas was 3:1 NH$_3$:N$_2$. As in Example 3. the total pressure in the feed stream was increased to produce the various partial pressures of NH$_3$(g). Typical results are shown in Table III below.

TABLE III

PERFORMANCE OF A POLY(VINYLAMMONIUM THIOCYANATE) MEMBRANE

| | FEED GAS FLOW: 60 SCCM | | PERMEATE GAS He FLOW: 20 SCCM | | PERMEANCE | SELECTIVITY |
|---|---|---|---|---|---|---|
| TEMP (°C.) | P(NH$_3$) (kPa) | P(N$_2$) (kPa) | P(TOTAL) (kPa) | VOL % NH$_3$ | $\phi$(NH$_3$) (cm$^3$/cm$^2 \cdot$ s $\cdot$ cmHg) | $\alpha$(NH$_3$/N$_2$)* |
| 17 | 78 | 26.6 | 106 | 2.25 | 0.98 × 10$^{-4}$ | >900 |
| 17 | 452 | 150 | 605 | 23.0 | 2.5 × 10$^{-4}$ | >1100 |
| 52 | 218 | 73 | 292 | 9.3 | 1.5 × 10$^{-4}$ | >1000 |
| 52 | 452 | 150 | 595 | 21.1 | 2.2 × 10$^{-4}$ | >1100 |
| 73 | 235 | 78 | 307 | 7.6 | 1.1 × 10$^{-4}$ | >900 |
| 73 | 449 | 149 | 590 | 16.5 | 1.6 × 10$^{-4}$ | >1000 |

*Corrected for background N$_2$

The performance of PVNH$_3$+SCN$^-$ is clearly better than that of PVNH$_3$+Cl$^-$. This is consistent with the higher solubility of NH$_3$(g) in the former vs. the latter (Ex. 1, 2).

Examination of Table III reveals that the NH$_3$(g) was fed to membrane at $\approx$15 sccm (at 452 kPa, 17° C.), while it is being removed at the permeate at $\approx$4.6 sccm. Thus recovery is about 30%. An even greater $\phi$NH$_3$ should be realized under conditions approaching zero recovery; i.e., where the rate at which NH$_3$ is being fed to the system is much greater than the rate at which it permeates through the membrane.

EXAMPLE 6

Performance of a PVNH$_3$+SCN$^-$ Membrane Prepared by Dialysis Methods

A 100-fold excess of NH$_4$SCN was added to a 4% aqueous solution of PVNH$_3$+Cl$^-$. The mixture was stirred for two hours at 25° C. and subsequently transferred to a dialysis apparatus (Spectrum Medical, Los Angeles, Calif.). Dialysis was continued for 73 hours; the dialate was changed ca. every 12 hours. The concentrate, i.e., exchanged polymer was then either precipitated with acetone or evaporated to dryness. The extent of exchange (Cl$^-$ to SCN$^-$) was determined by elemental analysis (Table IV). Conversion to the SCN$^-$ form was $\approx$72%.

TABLE IV

ELEMENTAL ANALYSIS OF PVNH$_3$+SCN$^-$ PREPARED BY DIALYSIS METHOD

| | % C | % H | % N | % Cl | % S |
|---|---|---|---|---|---|
| PVNH$_3$+Cl$^-$ (Starting Material) | 26.04 | 8.1 | 15.01 | 36.82 | 0.004 |
| PVNH$_3$+Cl$^-$ (After Dialysis with NH$_4$SCN) | 33.88 | 7.05 | 24.79 | 2.69 | 23.01 |

A membrane was prepared by redissolving the solid polymer, prepared as above in H$_2$O to give a 3-4% solution followed by evaporation to dryness under N$_2$. The film was supported between two pieces of woven stainless steel wire mesh (as in Example 4 ) and tested for the separation of ammonia from ammonia/nitrogen mixtures. Results are shown in Table V.

TABLE V

PERFORMANCE OF A PVNH$_3$+SCN$^-$ MEMBRANE PREPARED VIA DIALYSIS, AT 26° C.

| FEED GAS | | | PERMEATE GAS | | | PERMEANCE | SELECTIVITY |
|---|---|---|---|---|---|---|---|
| P(NH$_3$) (kPa) | P(N$_2$) (kPa) | Flow Rate (SCCM) | P(TOTAL) (kPa) | VOL % NH$_3$ | He Sweep Flow Rate (SCCM) | $\phi$(NH$_3$) (cm$^3$/cm$^2 \cdot$ s $\cdot$ cmHg) | $\alpha$(NH$_3$/N$_2$) |
| 827 | 1005 | 40 | 4728 | 20.05 | 20 | 1.4 × 10$^{-4}$ | >2500 |
| 827 | 1005 | 40 | 1728 | 9.25 | 40 | 0.9 × 10$^{-4}$ | >3700 |

TABLE V-continued

PERFORMANCE OF A PVNH$_3^+$SCN$^-$ MEMBRANE
PREPARED VIA DIALYSIS, AT 26° C.

| FEED GAS | | | PERMEATE GAS | | | | |
|---|---|---|---|---|---|---|---|
| P(NH$_3$) (kPa) | P(N$_2$) (kPa) | Flow Rate (SCCM) | P(TOTAL) (kPa) | VOL % NH$_3$ | He Sweep Flow Rate (SCCM) | PERMEANCE $\phi$(NH$_3$) (cm$^3$/cm$^2$ · s · cmHg) | SELECTIVITY $\alpha$(NH$_3$/N$_2$) |
| 827 | 1005 | 80 | 1728 | 19.76 | 20 | 1.4 × 10$^{-4}$ | >2000 |

EXAMPLE 7

Performance of a PVNH$_3^+$SCN$^-$ Membrane at 30°–60° C. and High Pressures of Ammonia A PVNH$_3^+$SCN$^-$ membrane was prepared as described in Example 6. The film, on a ≈50 μm thick porous Teflon ® support was sealed in a test cell of area 2.54 cm$^2$ using woven stainless steel mesh as support. In these experiments, no helium sweep was used. The pressure in the permeate stream, which because of the excellent selectivity was almost pure NH$_3$(g), was maintained at 275–350 kPa NH$_3$(g). The flux of permeant NH$_3$(g) was measured with an electronic mass flow meter which was positioned in the gas stream after the back pressure regulator. Selectivity was determined, as before, using a GC. Representative data is given in Table VI.

TABLE VI

PERFORMANCE OF A PVNH$_3^+$SCN$^-$ MEMBRANE AT 30-60° C.
AND HIGH AMMONIA PRESSURES

| | FEED GAS FLOW: 60 SCCM | | PERMEATE GAS FLOW: (No Helium Sweep) | PERMEANCE | |
|---|---|---|---|---|---|
| TEMP (°C.) | P(NH$_3$) (kPa) | P(N$_2$) (kPa) | P(TOTAL) (kPa) | $\phi$(NH$_3$) (cm$^3$/cm$^2$ · s · cmHg) | SELECTIVITY $\alpha$(NH$_3$/N$_2$) |
| 30 | 828 | 967 | 312 | 1.2 × 10$^{-5}$ | >2200 |
| 60 | 794 | 967 | 276 | 4.3 × 10$^{-5}$ | >2200 |
| 60 | 1174 | 967 | 345 | 3.4 × 10$^{-5}$ | >2100 |

EXAMPLE 8

Fabrication and Performance of an Encapsulated PVNH$_3^+$SCN$^-$ Membrane

An encapsulation or "sandwich" Membrane of PVNH$_3^+$SCN$^-$ was prepared as follows. A thick film of poly(trimethylsilylpropyne) (PTMSP) was cast from a solution of the polymer in toluene. Over this was cast, from aqueous solution, a film of PVNH$_3^+$SCN$^-$. Finally, a covering top layer of PTMSP was formed. The composite ranged in thickness from 1160–170 μm ca. 100–300 μof which was PVNH$_3^+$SCN$^-$. The membrane was sealed in a cell of area 0.78 cm$^2$ using a sintered stainless steel frit for mechanical support. Permeance data was determined at 26° C. using a feed of 115 psia NH$_3$ plus varying amounts of N$_2$. Results are summarized in Table VII below.

TABLE VII

PERFORMANCE OF AN ENCAPSULATED PVNH$_3^+$SCN$^-$
MEMBRANE AT 26° C.

| FEED GAS FLOW: 60 SCCM | | PERMEATE GAS He FLOW: 20 SCCM | | | |
|---|---|---|---|---|---|
| P(NH$_3$) (kPa) | P(N$_2$) (kPa) | P(TOTAL) (kPa) | VOL % NH$_3$ | PERMEANCE (cm$^3$/cm$^2$ · s · cmHg) | SELECTIVITY $\alpha$(NH$_3$/N$_2$) |
| 794 | 1253 | 100 | 30.9 | 3.4 × 10$^{-4}$ | 1500 |
| 794 | 1985 | 100 | 23.7 | 2.3 × 10$^{-4}$ | 1300 |
| 794 | 2329 | 100 | 21.8 | 2.1 × 10$^{-4}$ | 1200 |
| 794 | 3480 | 100 | 17.2 | 1.5 × 10$^{-4}$ | 1100 |
| 794 | 5127 | 100 | 12.8 | 1.1 × 10$^{-4}$ | 970 |
| 794 | 5845 | 100 | 11.8 | 0.97 × 10$^{-4}$ | 890 |

EXAMPLE 9

Performance of an Encapsulated PVNH$_3$ +SCN$^-$ Membrane for the Separation of NH$_3$ from N$_2$ and H$_2$.

An encapsulated PVNH$_3$ +SCN$^-$ membrane was prepared as in Example 8. The film was sealed in a cell of area 0.78cm$^2$ and tested for NH$_3$, N$_2$, and H$_2$ permeation. A palladium tube was used to diffuse permeant H$_2$ into a nitrogen stream, which was then analyzed using a separate GC thermal conductivity detector. There was a measurable amount of H$_2$ in the helium swept permeate stream (10 SCCM He) only at high feed partial H$_2$ pressures (1488 kPa). Ammonia and N$_2$ were analyzed as in previous examples. The He swept permeate stream was maintained at about 1 atm (100 kPa). The results are shown in Table VIII below.

TABLE VIII

PERFORMANCE OF AN ENCAPSULATED $PVNH_3^+SCN^-$ MEMBRANE FOR THE SEPARATION OF $NH_3$ FROM $N_2$ and $H_2$

| FEED GAS FLOW: 60 SCCM | | | PERMEANCE ($cm^3/cm^2 \cdot s \cdot cmHg$) | | | SELECTIVITY | |
|---|---|---|---|---|---|---|---|
| TEMP (°C.) | $PNH_3$ (kPa) | $PH_2$ (kPa) | $PH_2$ (kPa) | $\phi NH_3 \times 10^4$ | $\phi N_2 \times 10^8$ | $\phi H_2 \times 10^8$ | $\alpha NH_3/N_2$ | $\alpha NH_3/H_2$ |
| 24 | 794 | 534  | 1247 | 1.03 | 2.5 | —    | 4100 | —    |
| 24 | 794 | 818  | 1909 | 0.92 | 2.9 | —    | 3200 | —    |
| 24 | 794 | 1280 | 2988 | 0.60 | 2.0 | —    | 3000 | —    |
| 24 | 794 | 1488 | 3472 | 0.54 | 1.5 | 0.87 | 3600 | 6200 |
| 60 | 794 | 1488 | 3472 | 0.32 | 1.6 | 2.3  | 2000 | 1400 |

EXAMPLE 10

Performance of a Polyacrylate Membrane

A membrane was fabricated by first neutralizing poly(acrylic acid) (Aldrich, MW=600,000) with $NH_4OH$ and then evaporating the solution to dryness. The resulting film, ca. 180–260 μm thick, was tested for selective ammonia permeation under 830 kPa $NH_3$. The observed flux was $6.9 \times 10^{-7}$ cm$^3$/cm$^2$.sec.cmHg $NH_3$ at 26° C. The selectivity for ammonia over nitrogen was 50.

EXAMPLE 11

Use of a Quaternary Amine Anion Exchange Membrane

An anion exchange membrane (exchange capacity 1-9 meq/g) consisting of a quarternized ammonium functionalized styrene/butadiene material with $Cl^-$ counter ions (Asaki Glass, type AMV membrane) was used. This membrane l=200 μm in the $Cl^-$ form, was sealed in a cell of area 1.3 cm$^2$ and tested for $NH_3$ permeation with a feed of 304 kPa $NH_3$+101 kPa $N_2$ at 26° C. An ammonia permeance of $\phi(NH_3)=3.8 \times 10^6$ cm$^3$/cm$^2$.sec.cmHg was observed with an $\phi(NH_3/N_2)$ of 300–500.

A thiocyanate exchanged form of this membrane was prepared by soaking the above $Cl^-$ counterion material in concentrated KSCN/MeOH and then ringsing thoroughly with MeOH. The performance of this membrane (l=140 μm) was a follows: $NH_3$ permeance=$7.3 \times 10^{-6}$ cm$^3$/cm$^2$.sec.cmHg with $\phi(NH_3/N_2)=80$ at 27° C.

EXAMPLE 12

(Comparative) Performance of a $PVNH_2$ Membrane

A Poly(vinylamine), $PVNH_2$, film ca. 150 μm in thickness was prepared. A film as described previously and tested for the separation of ammonia from ammonia/nitrogen mixtures at 26° C. The feed mixture was 2:1 $NH_3$:$N_2$ at 1 atm. Helium, at 10 sccm, swept the permeate side, also at 1 atm. Under these conditions, no permeation of $NH_3$ or $N_2$ was observed.

EXAMPLE 13

(Comparative) Performance of a $PVNMe_2$ Membrane

N,N dimethyl polyvinylamine, $PVNMe_2$, was prepared in ca 60% yield by the reaction of $PVNH_2$ with $CH_3I$. The remainder of this polymer was presumably a mixture of the mono N-methylated polymer. At a pressure of 50 kPa $NH_3$+50 kPa $N_2$ this film exhibited a permeability of less than 2 Barrers $NH_3$ and 4.6 Barrers $N_2$ at 18° C.

It is clear from these and the above examples that ionic polymers i.e., ionomers, are required for the effective permeation of ammonia, and that such ionic polymers are useful as absorbents and membranes for the selective separation of ammonia from other gaseous and/or liquid components.

Having thus described the present invention, what is now deemed appropriate for Letters Patent is set out in the following appended claims.

What is claimed is:

1. A process for separating ammonia from a mixture of gases containing ammonia and at least one other component, said process comprising: contacting said mixture with an anion-exchange polymer, cast into membrane form, having the general structural formula:

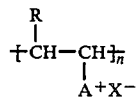

where R is methyl, phenyl or hydrogen, $A^+$ is any bound cationic species, $X^-$ is any anion and n is between 10 and $10^7$.

2. A process in accordance with claim 1 wherein $A^+$ is $NH_3^+$.

3. A process in accordance with claim 2 wherein $X^-$ is selected from the group consisting of $SeCN^-$, $TeCN^-$, $SCN^-$, $I^-$, $NO_3^-$, $Br^-$, $Cl^-$ and $R'COO^-$ where R' is H or an alkyl group.

4. A process in accordance with claim 1 wherein said polymer has the structural formula:

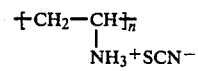

wherein "n" is between 10 and $10^7$.

5. A process in accordance with claim 1 wherein the anion-exchange polymer, cast into membrane form, is in the form of a flat sheet or disc, hollow fiber, or spiral wound flat sheet.

6. A process in accordance with claim 1 wherein the anion-exchange polymer also contains one or more copolymerizable monomers.

7. A process in accordance with claim 1 wherein ammonia is separated from an ammonia synthesis plant recycle loop gas comprising $NH_3$, $N_2$, $H_2$, $CH_4$ and Ar.

8. A process for separating ammonia from a mixture of gases containing ammonia and at least one other component, said process comprising: contacting said mixture with an ion-exchange polymer, cast into membrane form, having the general structural formula:

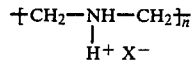

wherein $X^-$ is any anion and n is between 10 and $10^7$.

9. A process in accordance with claim 8 wherein $X^-$ is selected from the group consisting of $SeCN^-$, $TeCN^-$, $SCN^-$, $I^-$, $NO_3^-$, $Br^-$, $Cl^-$ and $R'COO^-$ where $R'$ is H or an alkyl group.

10. A process in accordance with claim 8 wherein the anion-exchange polymer active element is present in an encapsulated form within a flat sheet, disc, spiral wound sheet membrane or encapsulated within the walls of a hollow fiber membrane.

11. A process in accordance with claim 8 wherein the membrane is in the form of a flat sheet or disc, a spiral wound sheet or a hollow fiber.

12. A process in accordance with claim 11 wherein the anion-exchange polymer active element is present in an encapsulated form within a flat sheet, disc, spiral wound sheet membrane or encapsulated within the walls of a hollow fiber membrane.

13. A process for separating ammonia from a mixture of gases containing ammonia and at least one other component comprising: contacting said mixture with an anion exchange polymer, having the general structural formula:

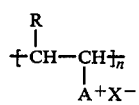

where R is methyl phenyl or hydrogen, $A^+$ is any bound cationic species, $X^-$ is any anion and n is between 10 and $10^7$, such that said polymer selectively and reversibly sorbs ammonia from the mixture.

14. A process in accordance with claim 13 wherein $A^+$ is $NH_3^+$.

15. A process in accordance with claim 13 wherein $X^-$ is selected from the group consisting of $SeCN^-$, $TeCN^-$, $SCN^-$, $I^-$, $NO_3^-$, $Br^-$, $Cl^-$ and $R'COO^-$ where $R'$ is H or an alkyl hydrocarbon chain.

16. A process in accordance with claim 13 wherein said polymer has the structural formula:

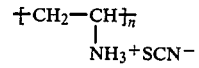

wherein n is between 10 and $10^7$.

17. A process of claim 13 wherein the ammonia is desorbed by lowering the ammonia pressure, heating the polymer containing the absorbed ammonia or a combination of the two.

18. A process in accordance with claim 13 wherein the said polymer is contained or encapsulated within a relatively gas permeable but water insoluble polymer.

19. A process for separating ammonia from a mixture of gases containing ammonia and at least one other component comprising: contacting said mixture with an anion exchange polymer, having the general structural formula:

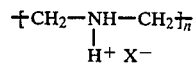

wherein $X^-$ is any anion and n is between 10 and $10^7$, such that said polymer selectively and reversibly sorbs ammonia from the mixture.

* * * * *